UNITED STATES PATENT OFFICE.

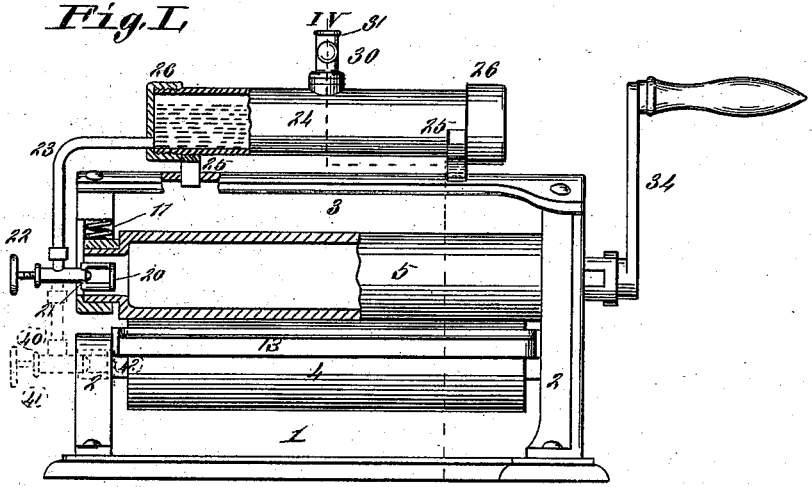

GUSTAVOS HEIDEL, OF ST. LOUIS, MISSOURI, ASSIGNOR TO THE NATIONAL SELF-HEATING SAD IRON COMPANY, OF SAME PLACE.

IRONING-MACHINE.

SPECIFICATION forming part of Letters Patent No. 400,678, dated April 2, 1889.

Application filed October 1, 1887. Serial No. 251,243. (No model.)

*To all whom it may concern:*

Be it known that I, GUSTAVOS HEIDEL, of the city of St. Louis, in the State of Missouri, have invented a certain new and useful Improvement in Ironing-Machines, of which the following is a full, clear, and exact description, reference being had to the accompanying drawings, forming part of this specification, and in which—

Figure I is a side view, part in vertical section, of my improved machine. Fig. II is a side elevation. Fig. III is an end view; and Fig. IV is a vertical transverse section taken on line IV IV, Fig. I.

My invention relates to an improved ironing-machine; and my invention consists in features of novelty, hereinafter fully described, and pointed out in the claim.

Referring to the drawings, 1 represents the base of the machine, having ends 2 and a top plate, 3. In the ends are journaled rollers 4 and 5. The lower roller, 4, is journaled in boxes 6, fitting in recesses 7, (see Fig. III,) made in the ends 2. Beneath the boxes 6 are springs 8, which hold the roller in its upper position. The upper roller, 5, is journaled in boxes 9, located in openings 10 in the ends 2. These boxes are held in their lower position by means of springs 11, pressing on the boxes 9. The rollers are held in contact by the springs, but are allowed to yield under sufficient pressure when the article being ironed is passed between them. The lower roller may be depressed or forced out of contact with the upper roller, when desired, by means of a frame, 13, hinged at 14 to arms 15 on the ends 2. This frame extends beyond the ends, as shown in Figs. III and IV, and it bears on the gudgeons or journals of the roller 4. By pressing on its outer end the roller will be forced down against the pressure of the springs 8 out of contact with the roller 5, and as soon as the pressure is removed from the frame the springs will automatically lift the roller into contact with the roller 5. The roller 5 is made hollow, as shown in Figs. I and IV. It is open at one end, as shown at 20, Fig. I, and into this open end fits a burner, 21, provided with a valve, 22. The burner is connected by means of a pipe, 23, to a supply tank or reservoir, 24, the tank or reservoir being filled with gasoline or other combustible.

The frame of the machine supports and carries the reservoir. I have shown it supported by means of U-shaped brackets 25, formed upon the upper side of the top plate, 3. The tank or reservoir rests in these brackets and is carried by them. It has preferably ends 26, which fit outside of the brackets 25 and in contact with them, as shown in Figs. I and II, so that the tipping of the machine is not liable to displace the reservoir.

In preparing the ironing-machine for use all that is necessary to do is to light the burner 21 and the products from it pass into the roller 5, which serves as a combustion-chamber, and which is thus heated. As soon as the roller becomes sufficiently heated, the machine is ready for use.

The tank or reservoir 24 may be provided with a valve, 30, in a pipe or tube, 31. By regulating the valve the necessary amount of air to replace the fluid in the reservoir may be regulated.

34 represents a crank on one of the rollers 4 5, preferably on 5, by which the machine is operated. If desired, both of the rollers could be made hollow and be provided with means for heating them, consisting in an extension, 40, of the pipe 23, the extension being provided with a valve, 41, and a burner, 42. (See dotted lines, Fig. I.)

I claim as my invention—

In an ironing-machine, the combination, with the frame, of a lower roller supported on springs 8 in each end of the frame, arms 15 on each end of the frame, frame 13, pivoted at 14 to said arms between the rollers, hollow upper roller held by springs in contact with the lower roller, burner for heating the upper roller, supply-pipe, and reservoir, all substantially as and for the purpose set forth.

GUSTAVOS HEIDEL.

In presence of—
 JOS. WAHLE,
 EDW. S. KNIGHT.